(12) United States Patent
Ferryanto et al.

(10) Patent No.: US 12,314,043 B2
(45) Date of Patent: May 27, 2025

(54) BAYESIAN DECOMPOSITION FOR MISMATCHED PERFORMANCES IN SEMICONDUCTOR EQUIPMENT

(71) Applicant: Applied Materials, Inc., Santa Clara, CA (US)

(72) Inventors: Liem Ferryanto, Gilroy, CA (US); Binbin Wang, San Jose, CA (US); Ravi C. Edupuganti, Austin, TX (US); Anshul Ashok Vyas, San Ramon, CA (US)

(73) Assignee: Applied Materials, Inc., Santa Clara, CA (US)

( * ) Notice: Subject to any disclaimer, the term of this patent is extended or adjusted under 35 U.S.C. 154(b) by 311 days.

(21) Appl. No.: 17/727,792

(22) Filed: Apr. 24, 2022

(65) Prior Publication Data

US 2023/0341841 A1 Oct. 26, 2023

(51) Int. Cl.
*G05B 19/41* (2006.01)
*G05B 19/418* (2006.01)
(Continued)

(52) U.S. Cl.
CPC ......... *G05B 19/41875* (2013.01); *G06N 5/04* (2013.01); *G06N 7/01* (2023.01);
(Continued)

(58) Field of Classification Search
CPC .... G05B 19/41875; G05B 2219/32368; G05B 2219/45031; G05B 19/4184; G06N 5/04; G06N 7/01
See application file for complete search history.

(56) References Cited

U.S. PATENT DOCUMENTS

| | | | |
|---|---|---|---|
| 6,978,189 B1* | 12/2005 | Bode | H01L 21/67288 700/121 |
| 2006/0217910 A1* | 9/2006 | Wang | G01R 31/2894 702/84 |

(Continued)

FOREIGN PATENT DOCUMENTS

KR 20200123480 A 10/2020

OTHER PUBLICATIONS

Application No. PCT/US2023/019299, International Search Report and Written Opinion, Mailed on Aug. 11, 2023, 13 pages.
(Continued)

*Primary Examiner* — Christopher W Carter
(74) *Attorney, Agent, or Firm* — Kilpatrick Townsend & Stockton LLP

(57) ABSTRACT

Bayesian inference and modeling techniques, along with model decomposition may be used to improve mismatch performances in semiconductor processing devices by identifying sources of intrinsic and extrinsic variations in performance. A network of causal relationships between processes and hardware in a semiconductor processing device may be accessed to generate a first Bayesian model for a first semiconductor processing device using the causal relationships in the network and performance data. A second Bayesian model may also be generated for a second semiconductor processing device using the causal relationships in the network and associated performance data. Response distributions generated by the first Bayesian model and the second Bayesian model may be compared to determine whether a performance of the of the first semiconductor processing device matches a performance of the second semiconductor processing device by decomposing the model transfer functions to identify the effects of intrinsic/extrinsic variables.

18 Claims, 12 Drawing Sheets

(51) Int. Cl.
G06N 5/04 (2023.01)
G06N 7/01 (2023.01)

(52) U.S. Cl.
CPC .............. *G05B 2219/32368* (2013.01); *G05B 2219/45031* (2013.01)

(56) References Cited

U.S. PATENT DOCUMENTS

| | | |
|---|---|---|
| 2007/0180411 A1* | 8/2007 | Swegat ............. H01L 21/67253 716/136 |
| 2009/0240366 A1 | 9/2009 | Kaushal et al. |
| 2012/0242667 A1 | 9/2012 | Kaushal et al. |
| 2020/0226742 A1 | 7/2020 | Sawlani et al. |
| 2021/0191272 A1 | 6/2021 | Buhl et al. |

OTHER PUBLICATIONS

International Preliminary Report on Patentability mailed on Nov. 7, 2024, in corresponding International Application No. PCT/US2023/019299, 7 pages.

\* cited by examiner

BAYESIAN DECOMPOSITION FOR MISMATCHED PERFORMANCES IN SEMICONDUCTOR EQUIPMENT

TECHNICAL FIELD

This disclosure generally describes identifying and correcting mismatched performances between semiconductor processing devices. More specifically, this disclosure describes a method of using Bayesian modeling and decomposition to identify intrinsic/extrinsic variations to adjust device operating parameters for optimal results.

BACKGROUND

Complex engineering systems may fail in myriad different ways. As engineering systems become more complex, the number of system functions that may have a causal effect on a failure continue to grow. When a failure occurs, it is often difficult to pinpoint a precise function that cause the failure. However, despite this difficulty, an accurate identification of causal risk factors for engineering failures can be monumentally important for preventing such failures from continuously occurring in the future. The current state-of-the-art is to use a linguistic scale basis to rank the risk of each input in a semi-quantitative way. For example, this ranking may be performed by a team of subject matter experts using a numerical scale (e.g., a 1-to-5 scale). Although this methodology uses a numerical ranking system, these ranks are often assigned based on user intuition and personal experience, which leaves these rankings open to cognitive biases. Consequently, human ranking systems resulting in longer times to identify root causes of engineering failures in complex systems.

BRIEF SUMMARY

In some embodiments, a method of identifying mismatched performances between semiconductor processing devices may include accessing a network of causal relationships between processes and hardware in a semiconductor processing device; generating a first Bayesian model for a first semiconductor processing device using the causal relationships in the network and first performance data; generating a second Bayesian model for a second semiconductor processing device using the causal relationships in the network and second performance data; and comparing response distributions generated by the first Bayesian model and the second Bayesian model to determine whether a performance of the of the first semiconductor processing device matches a performance of the second semiconductor processing device.

In some embodiments, a system may include one or more processors and one or more memory devices storing instructions that, when executed by the one or more processors, cause the one or more processors to perform operations. The operations may include accessing a network of causal relationships between processes and hardware in a semiconductor processing device; generating a first Bayesian model for a first semiconductor processing device using the causal relationships in the network and first performance data; generating a second Bayesian model for a second semiconductor processing device using the causal relationships in the network and second performance data; and comparing response distributions generated by the first Bayesian model and the second Bayesian model to determine whether a performance of the of the first semiconductor processing device matches a performance of the second semiconductor processing device.

In some embodiments, one or more non-transitory computer-readable media may include instructions that, when executed by one or more processors, cause the one or more processors to perform operations including accessing a network of causal relationships between processes and hardware in a semiconductor processing device; generating a first Bayesian model for a first semiconductor processing device using the causal relationships in the network and first performance data; generating a second Bayesian model for a second semiconductor processing device using the causal relationships in the network and second performance data; and comparing response distributions generated by the first Bayesian model and the second Bayesian model to determine whether a performance of the of the first semiconductor processing device matches a performance of the second semiconductor processing device.

In any embodiments, any and all of the following features may be implemented in any combination and without limitation. The method/operations may also include identifying variations in extrinsic variables in the first Bayesian model and the second Bayesian model indicating a sensitivity of the response distributions to hardware components in the first semiconductor processing device and the second semiconductor processing device. The method/operations may also include identifying variations in intrinsic variables in the first Bayesian model and the second Bayesian model indicating a sensitivity of the response distributions to connections between hardware components in the first semiconductor processing device and the second semiconductor processing device. The first Bayesian model may be represented using a transfer function. The transfer function may represent main effects, nonlinear effects, and interaction effects of the first semiconductor processing device that affect a response distribution of the first Bayesian model. The method/operations may also include performing a first decomposition of the transfer function by subtracting the second Bayesian model from the first Bayesian model to generate variations of a distinct extrinsic variable across an operating range of the distinct extrinsic variable and/or performing a second decomposition of the transfer function by aggregating each factor in the transfer function into variations of coefficients representing intrinsic variables for the distinct extrinsic variable. The system may be implemented on a controller of a semiconductor processing chamber. The system may be implemented on a central platform that is in communication with controllers for a plurality of semiconductor processing chambers in a facility. The system may be implemented on a remote server that is in communication with a plurality of different semiconductor processing facilities, each operating a plurality of semiconductor processing chambers. Determining whether the performance of the of the first semiconductor processing device matches the performance of the second semiconductor processing device may include calculating a J-S Divergence between the response distributions generated by the first Bayesian model and the second Bayesian model, and/or determining whether a similarity between the response distributions generated by the first Bayesian model and the second Bayesian model falls within a threshold of a Region of Practical Equivalence (ROPE). The method/operations may also include performing a sensitivity analysis on extrinsic variables to identify at least one extrinsic variable that causes a mismatch in the performance between the first semiconductor processing device and the second semiconductor processing device. The non-transitory computer-readable media, processors, and/or memory devices may be distributed between a controller of a semiconductor processing chamber and a remote server. The method/operations may also include identifying a cause of a mismatch in the performance between the first semiconductor processing device and the second semiconductor processing device. The method/operations may also include using the network of causal relationships to identify a hardware device, where operational parameters of the hardware device may be adjusted to correct the mismatch in the performance between the first semiconductor processing device and the second semiconductor processing device. The network of causal relationships may include a node layer representing on-wafer effects, a node layer representing functional requirements, and a node layer representing hardware components. The method/operations may also include accessing a system functional map comprising a data structure that relates requirements for the first semiconductor processing device to functional requirements for components in the first semiconductor processing device, then to technology components, then to on-wafer effects; and automatically generating the network from the functional map.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
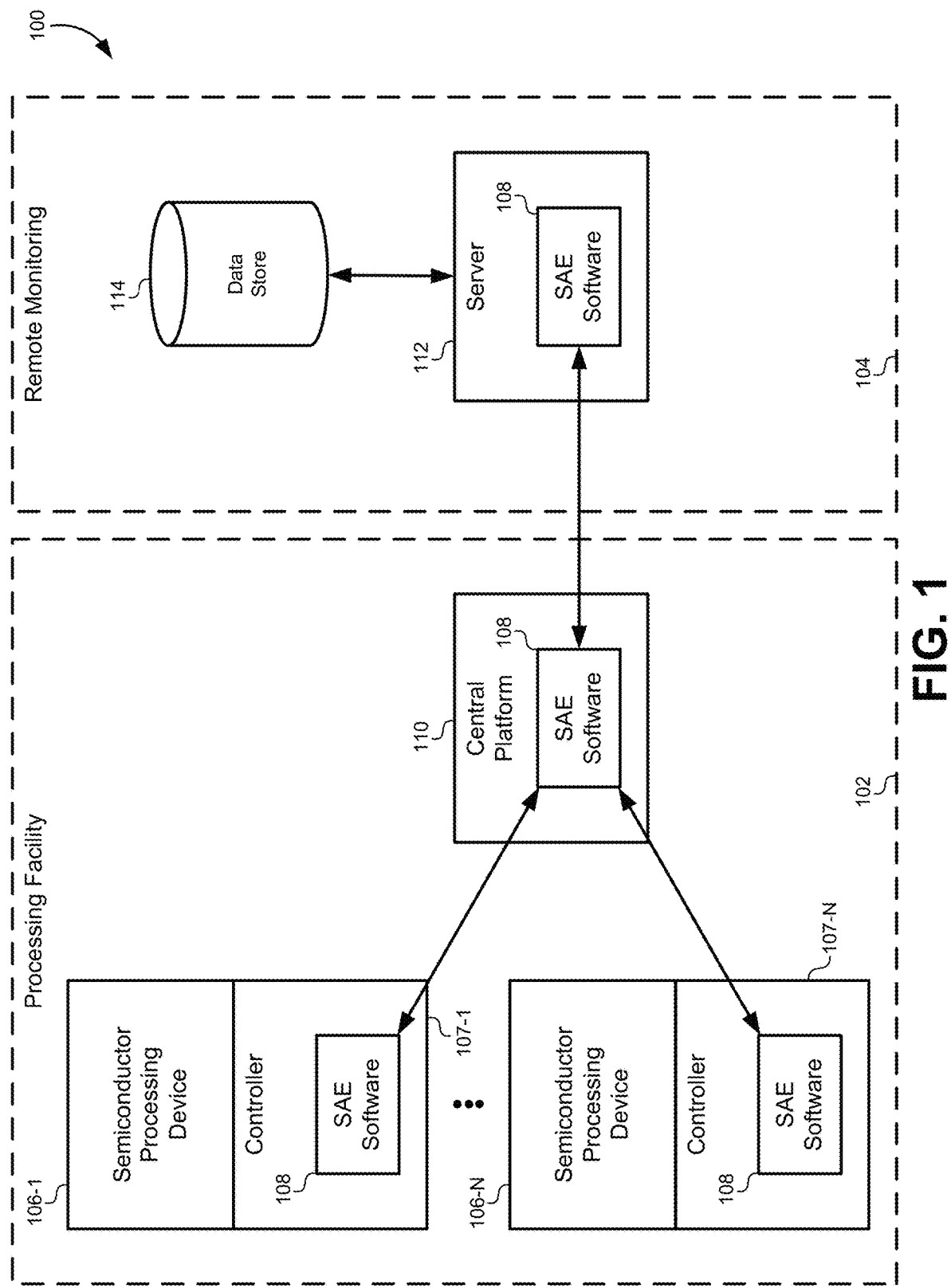
FIG. 1 illustrates a simplified diagram of a system operating an SAE software application, according to some embodiments.

Described herein are embodiments for providing an unbiased, physics-based, and probability-driven approach to identifying performance mismatches in semiconductor processing systems. This methodology is based primarily on probability mathematics, physics simulations, physical experiments, and quantitative analyses, which removes the cognitive biases that previously plagued systematic failure analysis. This system combines physics-based cause-and-effect relationships to generate a Bayesian network that links functional causes to failure outputs. The Bayesian network can be generated directly from functional mappings, device requirements, and design/technology requirements. The Bayesian network can then be verified using statistical checks, and probabilities for each node in the network can be set using discrete groupings of sensor data and/or simulated data. The Bayesian network may then represent known causal and probabilistic relationships between the operational requirements, technical functions, and design/technology components.

The network may be used to represent causal interconnected processes of a semiconductor processing device, such as a substrate processing chamber. This network may capture the system energy flow in a set of interconnected processes and hardware elements to represent cause-and-effect relationships in the actual system. After being validated, for example, via structured physical experiments, these causal relationships in the network may be used to build models that may then be used to simulate system performance responses in the form of a system transfer function. This transfer function may be decomposed and used to analyze individual extrinsic and/or intrinsic process characteristics. The results may be used to compare two different processes, either on the same machine using different substrates, or on different machines using different substrates. For example, the system may determine whether a resulting substrate characteristic (e.g., film thickness) will match between these two different systems based on the model outputs. The process may then identify and measure extrinsic variations representing the contribution of tolerances or degradations of architectural elements (e.g., knobs and hardware) and their interactions with the system performance. The process may also identify and measure intrinsic variations that represent the contribution of interconnection strengths of the architectural elements of the system at certain operating conditions. The identified extrinsic and/or intrinsic variations may then be used to identify probable causes of the potential mismatch and update the operating parameters of the system to generate matching outcomes.

This process of generating a network of causal relationships, modeling the systems, comparing the different device responses using the models, identifying extrinsic and/or intrinsic variations, and adjusting device operating parameters may be carried out entirely or in part by software processes. For example, an automated statistics-aided engineering (SAE) software application may operate on one or more computing systems to perform the operations described herein. These computing systems may be distributed throughout different facilities that participate in the semiconductor manufacturing process.

FIG. 1 illustrates a simplified diagram of a system 100 operating an SAE software application 108, according to some embodiments. A semiconductor processing facility 102 may include a number of different semiconductor processing devices 106. The semiconductor processing devices 106 may include semiconductor processing stations, such as etch chambers, deposition chambers, polishing chambers, cleaning chambers, metrology chambers, lithography chambers, and/or any other type of semiconductor processing chamber. Some of the semiconductor processing devices 106 may include controllers 107 that are integrated or in communication with the semiconductor processing devices 106. For example, a controller 107-1 may be integrated with a semiconductor processing device 106-1 to execute a recipe and control the operating parameters and environment inside the semiconductor processing device 106-1. Alternatively, the controller 107-1 may be communicatively coupled to the semiconductor processing device 106-1 through a wired or wireless communication, such as an EtherCAT connection.

The controllers 107 may include any type of computing system. For example, the controllers 107 may include one or more processors and one or more memory devices. The memory device(s) may include instructions that cause the processor(s) to perform the operations associated with the SAE software application 108. For example, instructions may be stored on one or more non-transitory computer-readable media to be executed by the processor(s). In this configuration depicted in FIG. 1, the controllers 107 may operate instances of the SAE software application 108 at the semiconductor processing devices 106. This may allow operators of the semiconductor processing devices 106 to directly perform the analysis and optimization operations described in detail below at the semiconductor processing devices 106 themselves. For example, the controllers 107 may include a display device and I/O devices (e.g., keyboards, mouse, etc.) that an operator may use to interact with the SAE software application 108. Examples of hardware/software that may be used to implement the controllers 107 are described in detail below in relation to FIG. 10.

Alternatively or additionally, the semiconductor processing facility 102 may include a central platform 110 that communicates with some or all of the controllers 107 and/or semiconductor processing devices 106. The central platform 110 may include a server that may perform operations such as monitoring the performance of the semiconductor processing devices 106, updating the software of the controllers 107, collecting and storing data measured from semiconductor substrates or recorded during semiconductor processes, and/or other data monitoring operations. In some embodiments, the central platform 110 may also include an instance of the SAE software application 108. This may allow operators of the central platform 110 to analyze the data from different semiconductor processing devices 106 and compare the performance of these devices using the SAE software application 108. For example, the central platform 110 may collect data from various semiconductor processing devices 106 in the semiconductor processing facility 102, generate and validate models based on the collected data and domain knowledge, and simulate the performance of the semiconductor processing devices 106 over a range of operating parameters. The operator at the central platform 110 may then analyze the simulation results to identify intrinsic and/or extrinsic factors that may cause performance mismatches between the various devices in the semiconductor processing facility 102.

In some configurations, a remote monitoring facility 104 may include a server that is also in communication with the semiconductor processing facility 102. For example, a remote server 112 located in a separate facility may communicate with the central platform 110 and/or any of the individual controllers 107 to collect and aggregate performance data. The remote server 112 may also include an instance of the SAE software application 108 such that the data can be collected, analyzed, and optimized remotely. Although not shown explicitly in FIG. 1, the remote monitoring facility 104 may be in communication with numerous semiconductor processing facilities. Therefore, the remote monitoring facility 104 may include a data store 114 that collects operational data from semiconductor processing devices 106 across a plurality of different processing facilities in addition to the semiconductor processing facility 102 depicted in FIG. 1. This allows the remote server 112 to compare the performance of semiconductor processing devices 106 operating a different facilities. For example, the remote monitoring facility 104 may be owned/operated by a manufacturer of at least some of the semiconductor processing devices 106. When the semiconductor processing devices 106 are sold or distributed to different semiconductor processing facilities, the remote monitoring facility 104 may continue to monitor and collect data from these facilities to be analyzed by the SAE software application 108. This allows results calculated by the SAE software application 108 (e.g., causes of mismatched performances) to not only be adjusted at the semiconductor processing facility 102 for immediate improvement, but they may also be used by the semiconductor processing device manufacturer to improve the design of the semiconductor processing devices 106.

An existing technical problem in semiconductor manufacturing occurs when the same semiconductor manufacturing process is carried out with the same or similar equipment but produces different results, which is referred to herein as a "mismatch." For example, a single semiconductor processing chamber may repeatedly execute a recipe to perform a specific process on a batch of semiconductor substrates. A "recipe" may include a set of operating parameters (e.g., current levels, timing sequences, power levels, gas flow rates, etc.) that are executed by the semiconductor processing chamber. However, not all semiconductor substrates in the batch will achieve the same results, even though the same recipe and chamber are used on the entire batch. For example, thicknesses of a deposited film may vary between individual substrates or locations on the same substrate. The embodiments described herein provide a method of identifying when these mismatched results occur and identifying probable causes and specific actions that may be taken to produce better results.

In another example, two different semiconductor processing stations may operate on separate semiconductor substrates. For example, two etch chambers of the same type (same manufacturer, recipe, operating parameters, etc.) may be configured to operate the same way, executing the same recipes on the same type of substrates. However, the substrates resulting from processes on both etch chambers may have results that are not entirely the same. The embodiments described herein also provide a method of identifying when mismatches occur between different semiconductor processing devices of the same type, and may be used to identify probable causes and specific actions that may be taken to produce better results.

Figure 2:
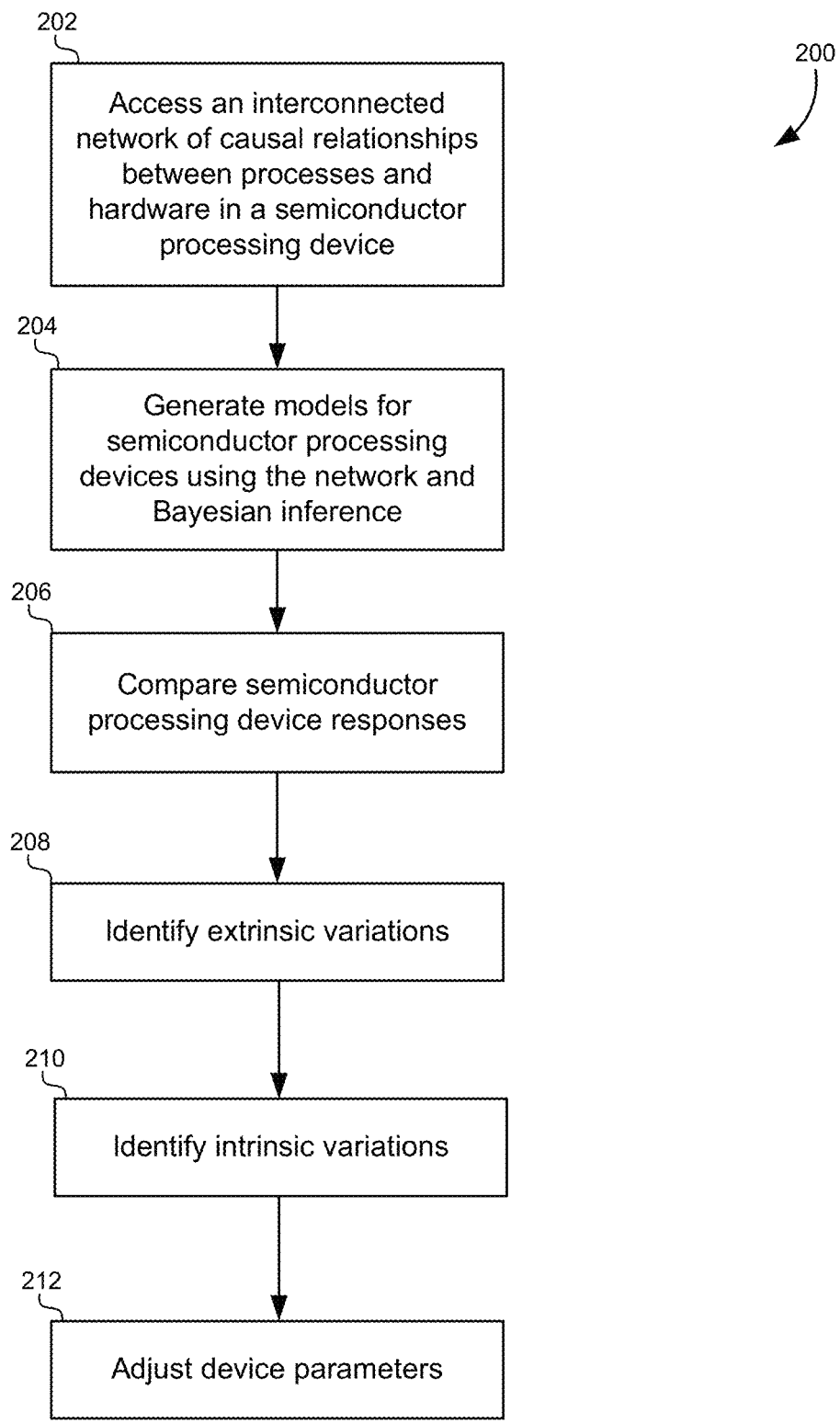
FIG. 2 illustrates a flowchart of a method for detecting mismatched performances between semiconductor processes, according to some embodiments.

FIG. 2 illustrates a flowchart 200 of a method for identifying mismatched performances between semiconductor processing devices, according to some embodiments. The semiconductor processes may include the same process performed by the same processing chamber or by different chambers as described above. This method may be executed using any of the computer systems described in this disclosure, including the controllers, servers, or central platform in FIG. 1. Each step in the flowchart 200 is described in detail in FIGS. 3-9, and reference will be made to these figures in describing each step. Additionally, this method is not limited specifically to semiconductor processing chambers. The semiconductor processing device may also include parts, modules, or components. For example, mismatches may be detected between different parts, and this method may be used to identify potential sources of that mismatch in performance.

The method may include accessing an interconnected network of causal relationships between processes and hardware in a semiconductor processing device (202). This network may start with a performance definition or product specification for a result specified by the customer, which may flow into process specifications, which in turn flow into specific hardware settings and devices. This network may include the components of the semiconductor processing system, and may represent the flow of energy and information through the system. In some cases, the system performing this method may begin by importing a system functional map and/or importing a component functional map. These functional mappings may be maintained in specialized software that tracks these relationships between functions, components, and results, and the software may provide data structures that represent these functional mappings to this method. Thus, this method step may include generating the interconnected network of causal relationships using these functional mappings.

Figure 3:
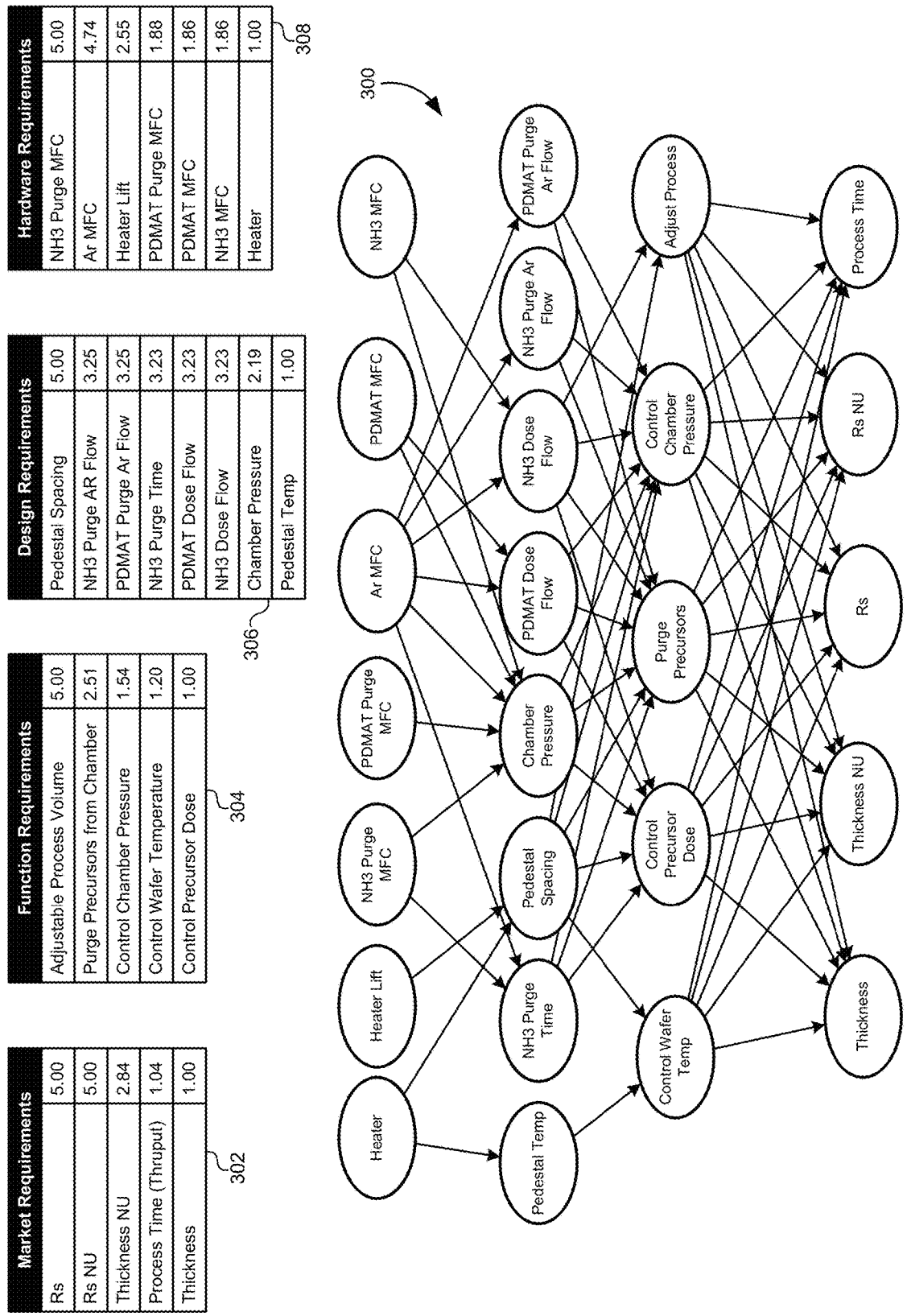
FIG. 3 illustrates a mapping between product requirements and functional requirements that may be used to generate the interconnected network of causal relationships, according to some embodiments.

FIG. 3 illustrates a mapping between product requirements and functional requirements that may be used to generate the interconnected network of causal relationships, according to some embodiments. For example, some embodiments may include a chemical vapor deposition (CVD) chamber for depositing films on semiconductor substrates. The operation and data generated by this CVD chamber is used only by way of example and is not meant to be limiting. Any other type of semiconductor processing device may be used in a similar manner.

Product requirements 302 may represent requirements placed on the system to perform properly. The "product" may be a product of the chamber, such as a semiconductor wafer having a film deposited thereon. These product requirements 302 may be set by the customer and may specify the performance metrics for the chamber or the characteristics of the resulting wafer. Product requirements may include measurable outputs, such as a deposition rate, a film thickness, a resistivity, a layer impurity, a throughput, a process time, and/or other results of a semiconductor manufacturing process. Product requirements may be represented at the system level, and component requirements may be represented at the component level.

A set of functional requirements 304 may be directly derived from the product requirements 302. For example, the product requirements 302 may be mapped to a set of functional requirements 304 that may be causally related to the product requirements 302. Based on the product requirements 302, a set of functional requirements 304 may be selected to be built into the processing chamber in order to generate the product requirements 302. For example, film thickness may be directly mapped to the control wafer temperature, the control precursor dose, and/or other functional requirements 304. The mapping may imply that the performance of a functional requirement 304 may impact a product requirement 302.

The mapping may be generated in a user interface where a subject matter expert can provide relationships in a matrix between the specific product requirements 302 and specific functional requirements 304 as illustrated in FIG. 3. For example, known relationships between product requirements and functional requirements may be represented. The user may provide an estimate of the strength of the relationship between the product requirement and the functional requirement. This may be characterized using a numerical requirement (e.g., 5.00). Therefore, this step may include a contribution of domain knowledge that is provided by an operator to form these relationships.

Multiple levels of mappings may be represented by different data structures. For example, some embodiments may also map functional requirements 304 to design requirements 306. Design requirements may represent different operations performed by technologies or components in the system. The functional requirements 304 of controlling pressure or controlling wafer temperature may be related to technology requirements 306 such as controlling a pedestal temperature, controlling a flow of various gases or other reactants (e.g., $NH_3$, etc.), controlling a chamber pressure, and/or other requirements that may be placed on different technology components. Similarly, the design requirements 306 may be mapped to a set of hardware requirements 308 that represent specific hardware devices or components that are present in the semiconductor processing device.

To generate the network structure 300, the structure may include a plurality of nodes. Each individual node may represent an entry in the requirements 302, 304, 306, 308 described above. The edges between these nodes in the data structure may represent relationships between the nodes. These relationships may be causal relationships between the functions, components, and/or requirements represented by the nodes. For example, a relationship or edge between two nodes in the data structure may indicate a causal relationship between the function in a parent node and a result in a child node.

In some embodiments, the system may automatically import the data structures representing the requirements 302, 304, 306, 308 to establish the nodes and relationships illustrated in the network structure 300. Note that some embodiments need not establish relationships between every node represented in a data structure. For example, the strength of the relationship (e.g., the numerical score) may be subjected to a threshold. If the strength of the relationship is not greater than the threshold, the relationship need not be represented in the network structure 300. Other embodiments may represent all relationships. The method may proceed automatically by creating nodes for every function, requirement, component, etc., that has at least one relationship with another function, requirement, component, etc., having a sufficient numerical score or user-assigned qualitative relationship. The method may then generate relationships between the nodes based on the relationships specified in the imported data structures.

In the example of FIG. 3, the different requirement levels may be mapped into layers of nodes in the network structure 300. For example, the nodes in the top-most layer of the network structure 300 may represent the hardware requirements 308. The nodes in the next highest layer may represent the design requirements 306, and so forth. Collectively, the nodes (along with any other internal layers not illustrated specifically in FIG. 3) may be referred to as component functions. For example, controlling the flow of a gas may be a functional requirement that corresponds to a component function, such as a gas valve that controls gas flow. Similarly, the partial pressure of the gas at a specific location on the wafer may also be included as a component function since this relates to a requirement for the gas control components. The nodes at the bottom layer of the network structure 300 may represent the on-wafer effects that may be measured and represent the product requirements 302. Therefore, the bottom layer of nodes may represent the on-wafer effects, and all nodes from which the on-wafer effects depend may be broadly referred to as component functions or hardware devices. The relationships in the network may represent causal dependencies between the various component functions and the resulting on-wafer effects.

Turning back briefly to FIG. 2, after developing the interconnected network of causal relationships, the method may also include generating models for semiconductor processing devices using the relationships and Bayesian inference (204). When performing a matching comparison, this step may involve generating models for each semiconductor processing device. Bayesian models may be used in some embodiments. For example, when comparing the performance of two chambers, the process may involve generating a first Bayesian model for a first semiconductor processing device using the causal relationships in the network, and generating a second Bayesian model for a second semiconductor processing device also using causal relationships in the network. As described below, the Bayesian models for both semiconductor processing devices may use performance data from structured experiments (e.g., first performance data and second performance data, respectively) in order to estimate coefficients used in the Bayesian models.

Figure 4:
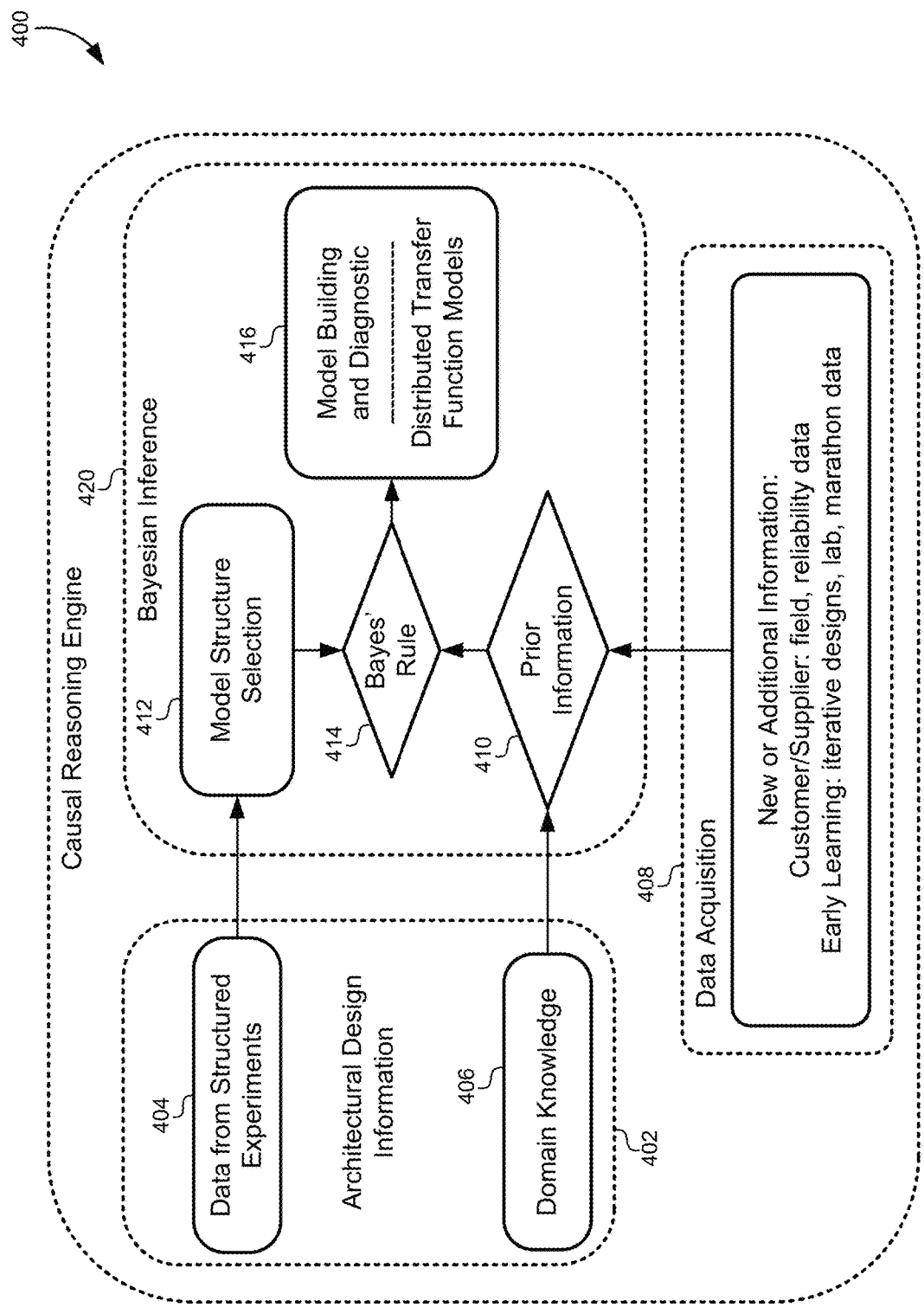
FIG. 4 illustrates a flowchart of a process for building one or more models based on Bayesian inference, according to some embodiments.

FIG. 4 illustrates a flowchart 400 of a process for building one or more models based on Bayesian inference, according to some embodiments. One input may include data from structured experiments 404. Generally, the data from the structured experiments 404 may be limited in its scope, as it may be too costly to perform a large number of marathon experiments on semiconductor substrates. Instead, this system may be tailored to use a smaller number of experiments (e.g., 15 to 30 substrates). The data may be collected from the semiconductor processing chambers in the form of unstructured observations of the responses of these chambers. Alternatively, structured experiments can be run. For example, the data from structured experiments 404 may be collected as metrology data from a metrology station.

In contrast to existing methods, these methods need not rely on data alone. Instead, the data can be supplemented using domain knowledge 406. The domain knowledge may include the network structure 300 described above that includes physical relationships between different variables in the system. In addition to the architectural design information 402, the data may also be supplemented with acquired data 408 that is received prior to building the model. The acquired data 408 may also be received after the model is created and used to refine the model. The acquired data may include field testing, reliability data, observational data, marathon testing, iterative designs, laboratory testing, and/or any other source of additional data regarding the process being modeled.

The domain knowledge 406 and the acquired data 408 may be referred to as "prior information" 410 when building the model using Bayes' Rule. Additional prior information may include previous model definitions, or engineering knowledge. For example, the network structure 300 and/or engineering knowledge may indicate that temperature and pressure are related and followed certain distributions. A specific model structure 412 may be selected and combined with the prior information 410 using Bayes' Rule 414 to generate the model 416.

Figure 5:
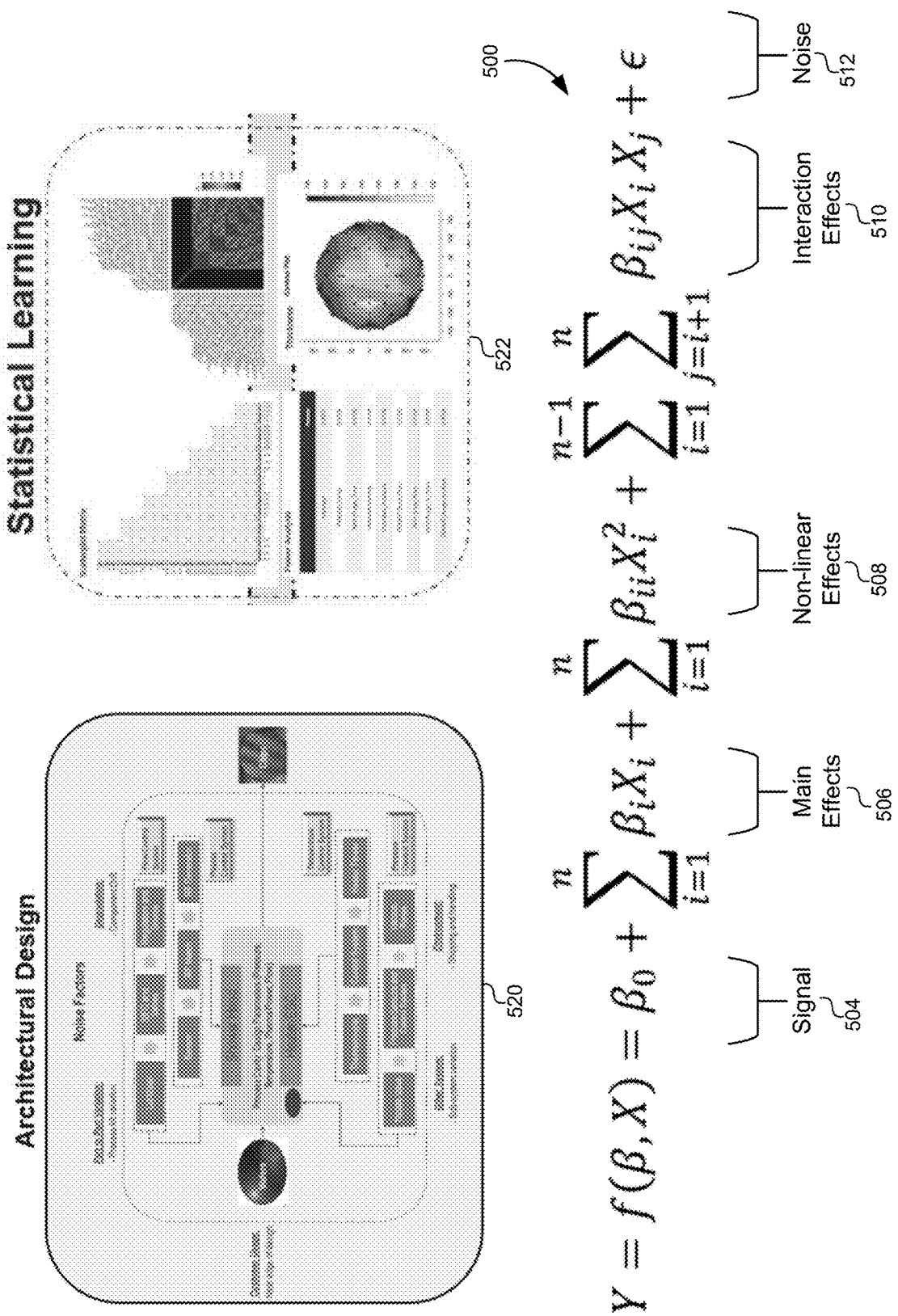
FIG. 5 illustrates how the prior knowledge described above can be incorporated with the experimental data to design a model for the semiconductor processing system.

FIG. 5 illustrates how the prior knowledge described above can be incorporated with the experimental data to design a model for the semiconductor processing system. Specifically, Bayes theorem provides a way to update or generate a model using prior knowledge when it becomes available about the physical operation of the system. For example, an architectural design 520 may include a physical architecture of the semiconductor processing device. This architectural design 520 may include the components listed in the network structure 300 described above indicating causal relationships in the functioning of the architectural design 520. This forms an initial starting point for the model. However, a determination still needs to be made as to whether the initial design is accurate and plausible. In terms of Bayes' Rule, this question about the feasibility of the initial architectural design may be referred to as p(Design), or the probability that the design is correct.

Next, experimental data 522 may be collected that results from experiments performed using the semiconductor processing device. This experimental data 522 may be used to validate or verify the architectural design 520, including the validity of the causal relationships between the hardware, functions, and design requirements. As a term in Bayes' Rule, this step may be normalized and formulated as follows.

$$\frac{p(\text{Result} \mid \text{Design})}{p(\text{Result})}$$

Finally, Bayes' Rule may be used to combine the prior or initial design with the experimental result to generate a posterior design indicating the probability of the design after the result has occurred.

$$p(\text{Design}) * \frac{p(\text{Result} \mid \text{Design})}{p(\text{Result})} = p(\text{Design} \mid \text{Result})$$

The resulting model may be expressed in terms of a transfer function 500. The transfer function 500 produces an output (Y) 502 representing the system performance response. The output 502 is expressed in the transfer function 500 as a function of extrinsic variables (X) and intrinsic variables ($\beta$). The extrinsic variables may represent variations due to tolerances or degradation of the architectural elements (e.g., hardware components, knobs, etc.) and their interactions. In contrast, the intrinsic variables may represent variations due to the interconnection strength of the architectural elements in the system. These intrinsic variables measure the contributions of the sensitivity of the system to operating windows in the operating parameters. For example, one example of a transfer function for the thickness of a film formed in a deposition chamber with estimated coefficients for may include the following.

Thickness=−16.6+0.64*Pedestal$_{Temp}$−0.0346*Pedestal$_{Spacing}$+0.0074*NH3$_{DoseFlow}$+0.037*NH3$_{PurgeArFlow}$−0.0045*PDMATPurgeArFlow+6.4*ChamberPressure+0.41*NH3PurgeTime+0.0035*PDMATDoseFlow+

0.012*Pedestal$_{Temp}$*ChamberPressure−
0.00017*PedestalTemp*NH3PurgeArFlow−
0.0044*NH3PurgeTime*PDMATDoseFLow+
0.00047*NH3PurgeTime*PDMATPurgeArFlow−
0.0023*ChamberPressure*PDMATDoseFlow−
0.00078*ChamberPressure*NH3PurgeArFlow+
0.000046*PDMATDoseFlow*NH3PurgeArFlow−
0.000014*NH3DoseFlow*PDMATPurgeArFlow In terms of the transfer function 500, the X terms representing extrinsic variables may correspond to physical characteristics, such as pressure, temperature, plasma power, gas flow, pedestal spacing, and so forth. The β terms representing intrinsic variables may be coefficients in the transfer function 500. To create an accurate transfer function 500, the transfer function 500 may include a base signal 504, main effects 506, nonlinear effects 508, interaction effects 510, noise 512, and/or other terms. Stated another way, the X terms may represent hardware components, and the β terms represent how those components are connected. Note that the number of different $X_i$ terms and $β_i$ terms may be large (e.g., more than 10), each of which may involve an aggregation/integration, resulting in computationally complex calculations. Note that the transfer function 500 does not represent single values, but instead represents distributions of values for each of the variables in the function. As described above, the validity of the transfer function 500 can be ascertained based on measurements and system responses to ensure that the model is accurate.

Turning back briefly to FIG. 2, the method may additionally include comparing semiconductor processing device responses using the model (206). While the structure of the models may be similar for each of the semiconductor processing devices, the different $X_i$ terms and $β_i$ terms may be different for each. The processes performed by the semiconductor processing devices may ideally generate identical substrates. However, as described above, processes involving the different substrates processed by the same device, or different substrates processed by different devices of the same type may be different, resulting in what is termed as a "mismatch." For example, when comparing the performance of two different semiconductor processing devices, this may involve comparing response distributions generated by the first Bayesian model and the second Bayesian model to determine whether a performance of the of the first semiconductor processing device matches a performance of the second semiconductor processing device.

Figure 6A:
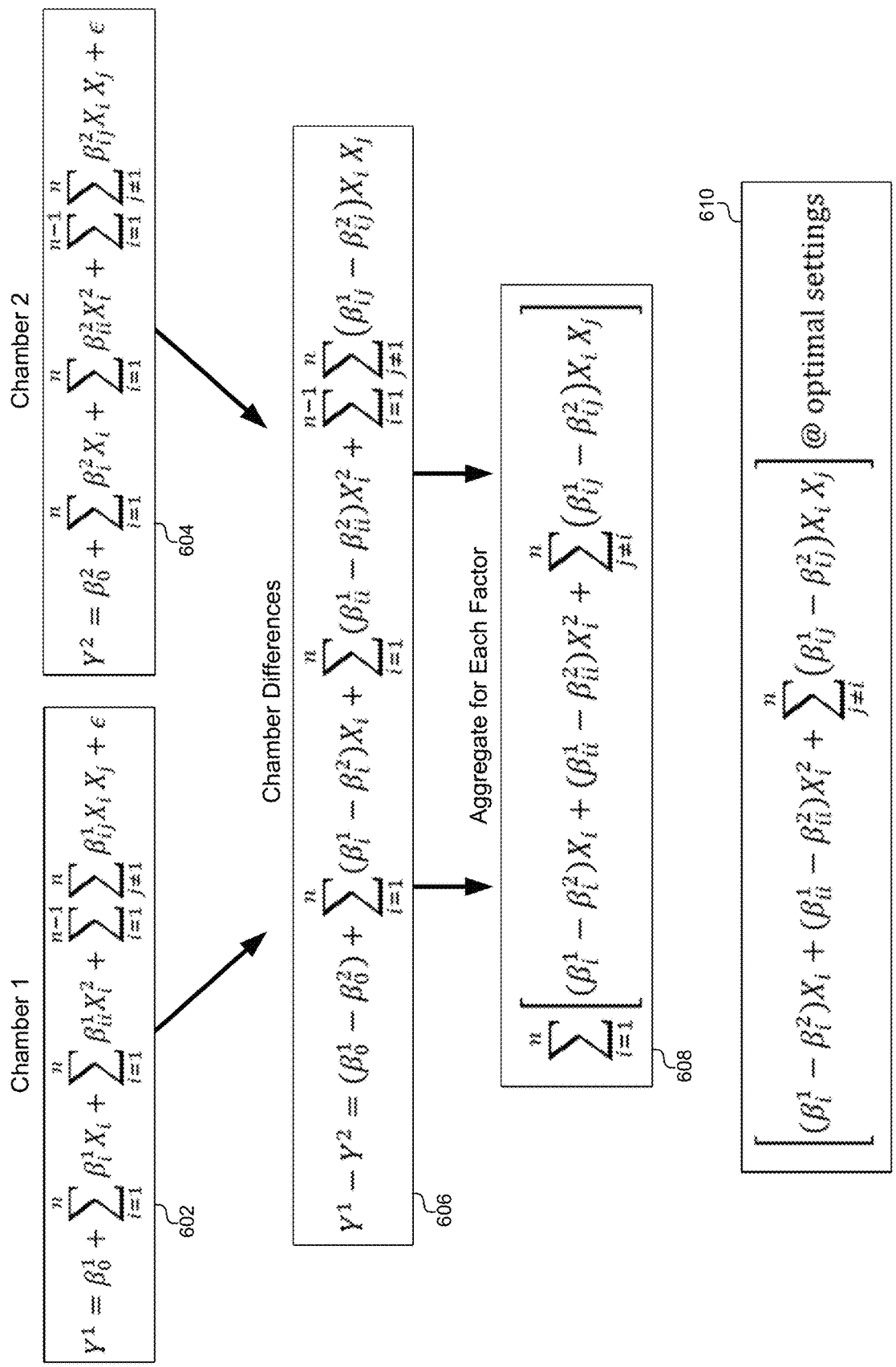
FIG. 6A illustrates models used for two different chambers for comparing the performance of the chambers, according to some embodiments.

FIG. 6A illustrates models used for two different chambers for comparing the performance of the chambers, according to some embodiments. The models for these chambers use the transfer functions in the form of the equations derived above in FIG. 5. Equation 602 may represent a first chamber, and equation 604 may represent a second chamber. These chambers may be the same type of chambers processing different substrates that are expected to have similar results. In other embodiments, these equations 602, 604 may represent other aspects of a semiconductor process, such as different devices or substrate locations. Using the output Y to represent the measured performance of each chamber or device, a comparison may be made between the two chambers to determine whether there is a mismatch in performance. Specifically, equation 606 may be derived by computing a difference between equation 602 for the first chamber and equation 604 for the second chamber. The resulting $Y^1-Y^2$ term should be approximately 0 if the chambers are performing identically. However, as the resulting $Y^1-Y^2$ term diverges from 0, this may indicate a performance mismatch between the first chamber and the second chamber.

Equation 606 may also represent a first level of a Bayesian two-level decomposition of the responses. When comparing two semiconductor processing devices, equation 606 may represent an example of performing a first decomposition of the transfer function by subtracting the second Bayesian model from the first Bayesian model to generate variations of a distinct extrinsic variable across an operating range of the distinct extrinsic variable. For example, equation 606 may decompose the response variations into measurable variations of a distinct X in the set of Xin its entire range of values (e.g., from $X_{low}$ to $X_{high}$) using a probabilistic sensitivity analysis to recognize and measure extrinsic variations as described above.

Equation 610 may represent a second level of the Bayesian two-level decomposition that decomposes the response variations into measurable variations of the coefficients (β) of a distinct X at its optimal setting using an aggregate difference analysis to recognize and measure extrinsic variations as described above. For example, equation 610 may represent performing a second decomposition of the transfer function by aggregating each factor in the transfer function into variations of coefficients representing intrinsic variables for the distinct extrinsic variable. The result of equation 610 may yield a distribution of response values for the distinct X at its optimal setting.

A number of different methods may be used in order to determine whether the responses of the first chamber and the second chamber match or represent a mismatched performance. These methods may use a Bayesian method of matching that considers the entire distribution of values instead of considering only single values (e.g., mean, standard deviation, etc.). In some embodiments, a difference between the distributions for the first chamber and the second chamber may be compared to a reference. For example, a Region Of Practical Equivalents (ROPE) may be used to determine how much of the distribution of the results for each chamber are within a specified practical range. Some embodiments may also use a High Density Interval (HDI) method to summarize the range of most credible values of the measurement within a limited range. This range may be determined by the practical operating conditions or recipes used in the chambers instead of across an entire range of possible values. Some embodiments may also use matching techniques such as J-S Divergence to compute a measure of similarity between the two distributions. For example, the process may calculate a J-S Divergence between the response distributions generated by the first Bayesian model and the second Bayesian model when comparing two semiconductor processing devices.

Figure 6B:
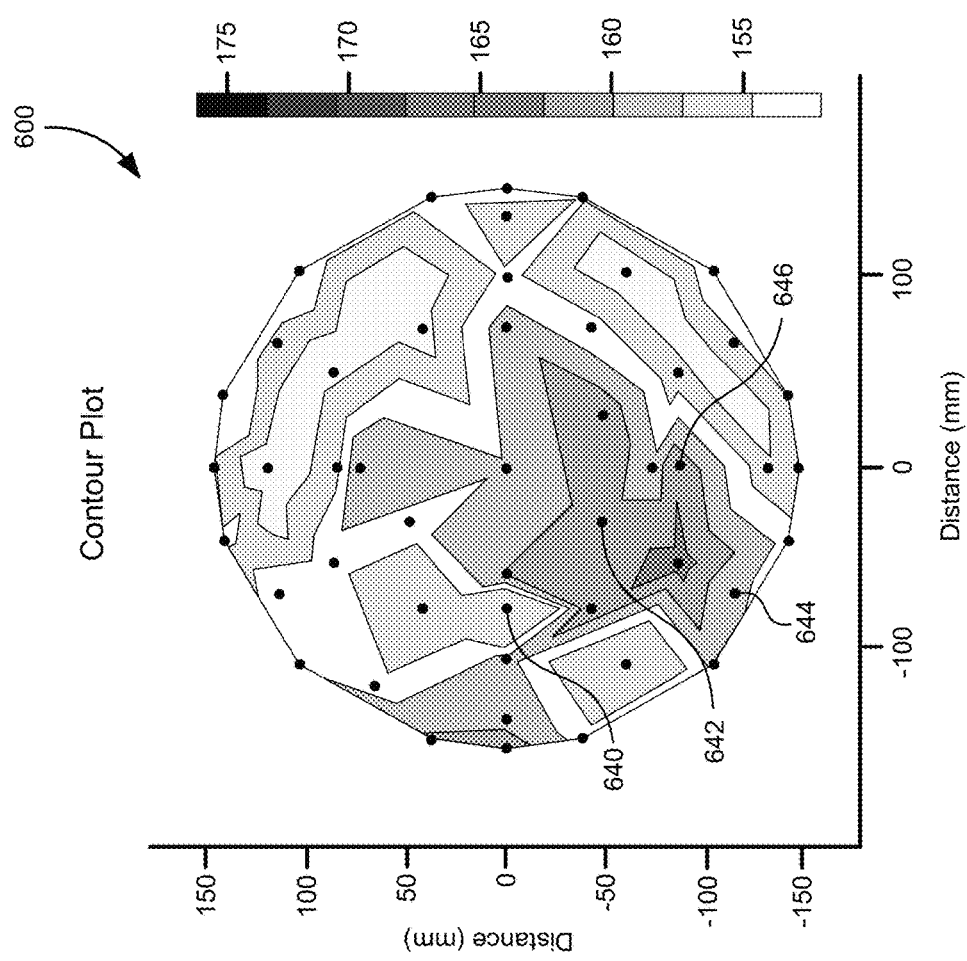
FIG. 6B illustrates an example of how the matching process described above may be carried out using deposition chambers, according to some embodiments.

FIG. 6B illustrates an example of how the matching process described above may be carried out using deposition chambers, according to some embodiments. The first chamber and the second chamber described above may represent deposition chambers of the same type processing different substrates. Alternatively, the method may be used to identify mismatched performances within the same physical chamber and/or on the same substrate. In this example, a contour plot 600 represents the thicknesses of a deposited film on a semiconductor substrate. The thickness of the substrate at location 642 and at location 646 is approximately the same based on the contour plot 600. However, the thickness of the substrate at location 640 compared to location 644 may be significantly different. The model describing the process above may be used to identify this mismatch in performance and to provide an indication of possible causes for the mismatch in performance.

Figure 6C:
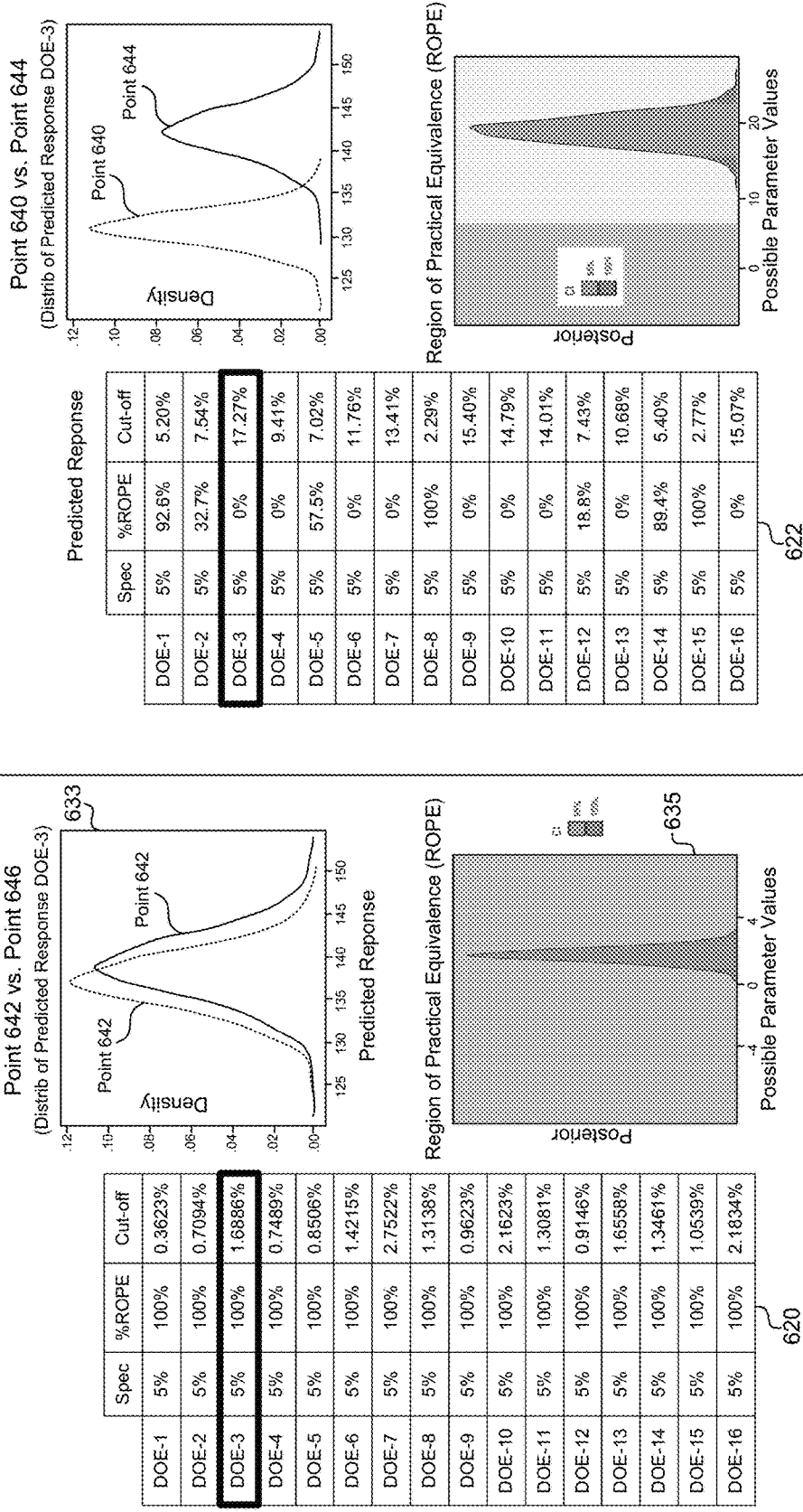
FIG. 6C illustrates the performance responses between matching and mismatched thickness locations, according to some embodiments.

FIG. 6C illustrates the performance responses between matching and mismatched thickness locations, according to some embodiments. The performance responses match when the matching response distribution of any possible design variable settings consistently match within a specification. In this example, the threshold of 5% or less may be used. If any of the response distributions of any design variable settings fall outside of this 5% match between the two locations, a mismatch in performance may be identified. Therefore, when comparing the performance of two semiconductor processing devices, this step may involve determining whether a similarity between the response distributions generated by the first Bayesian model and the second Bayesian model falls within a threshold of a ROPE.

In this example, results of different experiments (DOEs) have been determined in the tables illustrated in FIG. 6C. Table 620 shows the matching results of predicted responses for location 642 and location 646 over a range of different inputs represented by the different DOEs. Responses that match are determined to be greater than 95% inside of the ROPE, and they match within the entire design space (i.e., the recorded "cut off" values are less than the allowed 5% variation). Plot 633 and plot 635 illustrate these matching thickness performances when 100% of the 95% HDI is within the ROPE for DOE-3.

In comparison, the different predicted response distributions for the comparison between the responses at location 640 and location 646 illustrate a number of variable settings (e.g. DOE-) where the predicted responses are mismatched, even though other predicted responses in table 622 fall within 95% of the ROPE range. Plot 637 and plot 639 illustrate these matching thickness performances when 0% of the 95% HDI is within the ROPE for DOE-3.

These distributions and responses may be calculated using the Bayesian methods described above. Bayesian models may be used based on DOE data points to detect if the thickness values between various locations are functionally matching or not. In this example, these data may indicate that within the same chamber, location 642 matches location 646, while a mismatch occurs between location 640 and location 644.

Turning back briefly to FIG. 2, the method may also include identifying extrinsic variations (208). Extrinsic variations may be identified using the Bayesian decomposition described above and, for example, performing a probabilistic sensitivity analysis on the extrinsic variables over their operating range. For example, when comparing the performance of two different devices, this process may involve identifying variations in extrinsic variables in the first Bayesian model and the second Bayesian model. These variations in extrinsic variables may indicate a sensitivity of the response distributions to hardware components in the first semiconductor processing device and the second semiconductor processing device.

Continuing with this example, the transfer functions described above may be used to identify extrinsic variations between location 640 and location 644 that may be responsible for the detected mismatch in thickness. For example, the extrinsic variations represented by the X variables in the transfer functions may be used to perform a sensitivity analysis on these variable settings. In other words, a probabilistic sensitivity analysis may determine how much changes in each of the X variable settings across the entire range of values contribute to the mismatched performance $Y^1$-$Y^2$. When comparing the performance of two semiconductor processing devices, this step may involve performing a sensitivity analysis on extrinsic variables to identify at least one extrinsic variable that causes a mismatch in the performance between the first semiconductor processing device and the second semiconductor processing device.

Figure 7:
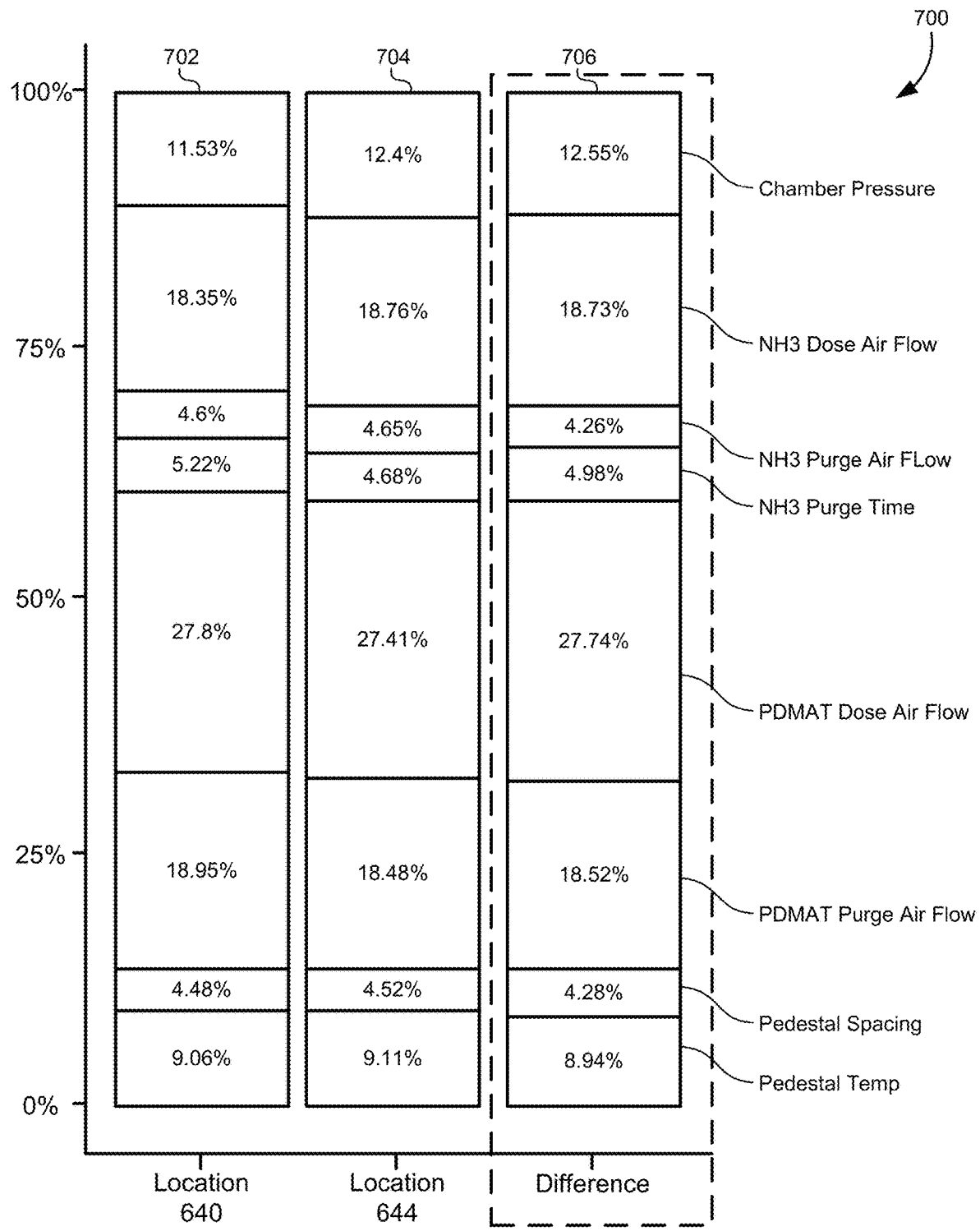
FIG. 7 illustrates the results of a sensitivity analysis of the predicted responses, according to some embodiments.

FIG. 7 illustrates the results of a sensitivity analysis of the predicted responses, according to some embodiments. The graph 700 illustrates how much variations in each variable X affect the resulting thickness at each location. Bar 702 represents the sensitivity for the X variables at location 640, bar 704 represents a sensitivity for the X variables at location 644, and bar 706 represents the difference between these predicted responses at each location. Bar 706 illustrates the major contributors that have an effect on the mismatched thickness of the deposited layer. Specifically, approximately 77% of the mismatch thicknesses on the substrate may be attributed to the PDMAT Dose Flow (27.74%), the $NH_3$ Dose Flow (18.73%), the PDMAT Purge Ar Flow (18.52%), and the Chamber Pressure (12.55%).

This information may be used to highlight the primary causes of the mismatch in performance on the substrate due to extrinsic factors. In this example, adjusting the PDMAT Dose Flow may have the largest effect on the mismatch between the two locations. Adjustments may be made to each of these parameters in order to bring the mismatched performance within the ROPE range.

However, adjusting the extrinsic factors alone may not be sufficient to remove all of the mismatched performances on the substrate. Some embodiments may also include evaluating the intrinsic variations at these two locations at the optimal recipe settings. Recall that the intrinsic variables ($\beta$) represented in the transfer function may be analyzed using Bayesian decomposition to determine how much the parameter differences ($\beta_i^1$-$\beta_i^2$) of each variable setting at a certain level affect the mismatch responses $Y^1$-$Y^2$ (e.g., an optimal setting determined from the extrinsic variation adjustments).

Turning back briefly to FIG. 2, the method may also include identifying intrinsic variations (210). These intrinsic variations may be identified using the Bayesian decomposition described above. When comparing two different semiconductor processing devices, identifying variations in intrinsic variables in the first Bayesian model and the second Bayesian model may indicate a sensitivity of the response distributions to connections between hardware components in the first semiconductor processing device and the second semiconductor processing device.

Figure 8:
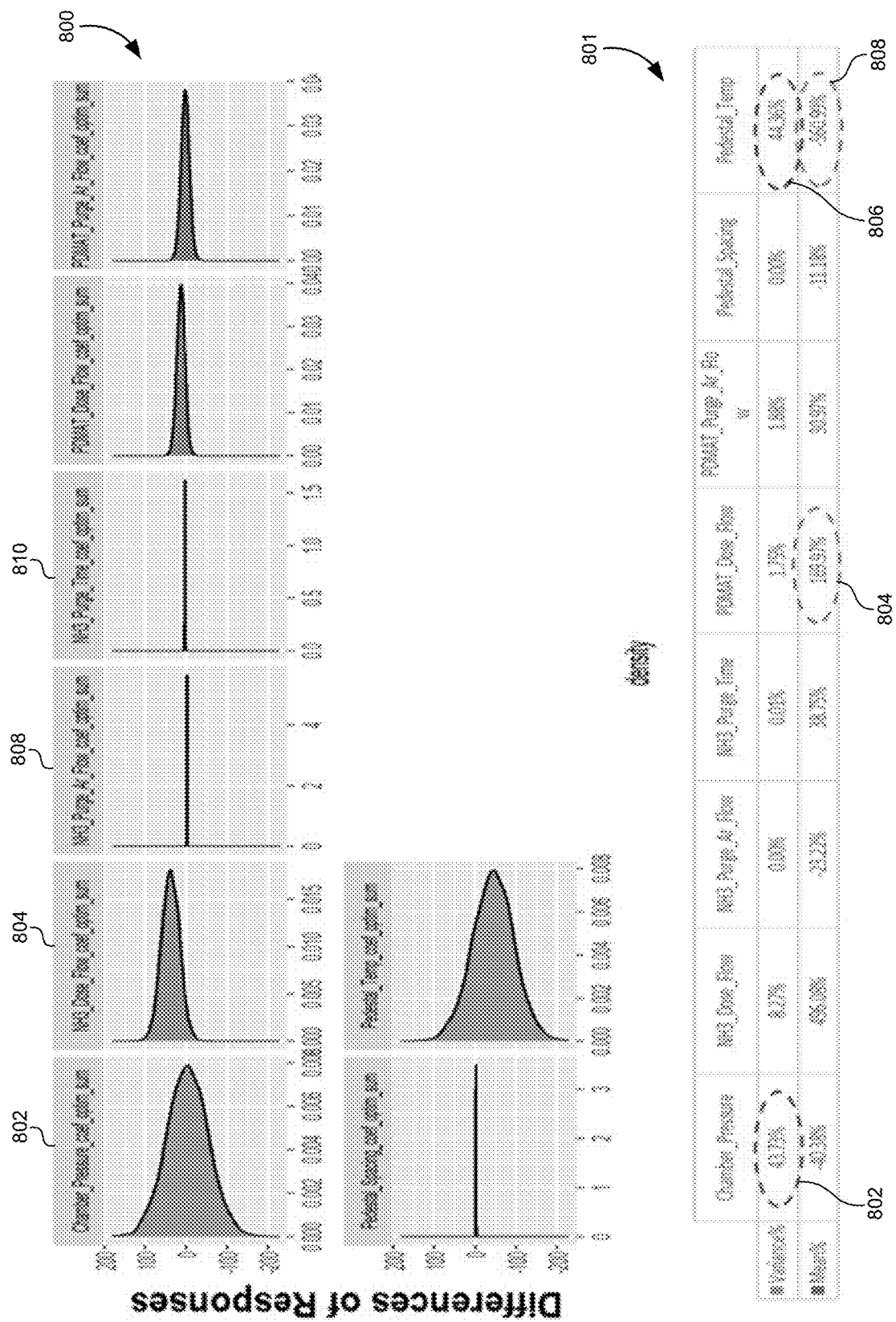
FIG. 8 illustrates intrinsic variations at two locations on the substrate, according to some embodiments.

FIG. 8 illustrates intrinsic variations at two locations on the substrate, according to some embodiments. The set of optimal settings may be determined as described above using the extrinsic variation adjustments. In this example, the optimal settings may include values for each of the variables X illustrated in FIG. 7 (e.g., Chamber Pressure=5 kPa, NH3 Dose Flow=158804 sccm, etc.). These values may be used to then generate distributions for the parameter differences ($\beta_i^1$-$\beta_i^2$) for each of the parameters $\beta_i$. A set of response graphs 800 may be generated to illustrate the distributions of the responses.

Where the distribution is very narrow, this may indicate that these particular intrinsic variables do not greatly affect the variation in the response. For example, graph 808 and graph 810 illustrate very narrow distributions that indicate that variations in the $NH_3$ Purge Ar Flow and the $NH_3$ Purge Time do not significantly affect the response. However, larger distributions, such as the distributions illustrated in graph 802 and graph 804 may indicate that variations in the corresponding intrinsic variables (such as intrinsic characteristics causing variations in the Chamber Pressure and the $NH_3$ Dose Flow) more significantly affect the variation in the response distribution. Illustrating the data another way, table 801 shows how the chamber pressure, dose flow, and pedestal temperature distributions have large variance and/or mean values relative to the other intrinsic variables. These values may be compared to a threshold to identify these intrinsic variables as being significant.

Turning back briefly to FIG. 2, the method may also include adjusting device parameters to compensate for intrinsic and/or extrinsic variations (212). How this step is implemented may vary depending on a type of mismatch being identified. As described above, mismatches may be identified between semiconductor substrates, locations on the semiconductor substrates, different semiconductor substrates in the same chamber, different semiconductor substrates in different chambers, and so forth. Based on the particular embodiment, the intrinsic/extrinsic variations may be mapped to physical or engineering knowledge to adjust the operation of a semiconductor chamber, adjust a design of the semiconductor device, determine the optimal performance settings for the semiconductor device, and so forth. For example, this step may involve using the network of causal relationships to identify a hardware device, where operational parameters of the hardware device may be adjusted to correct the mismatch in the performance between the first semiconductor processing device and the second semiconductor processing device.

Figure 9:
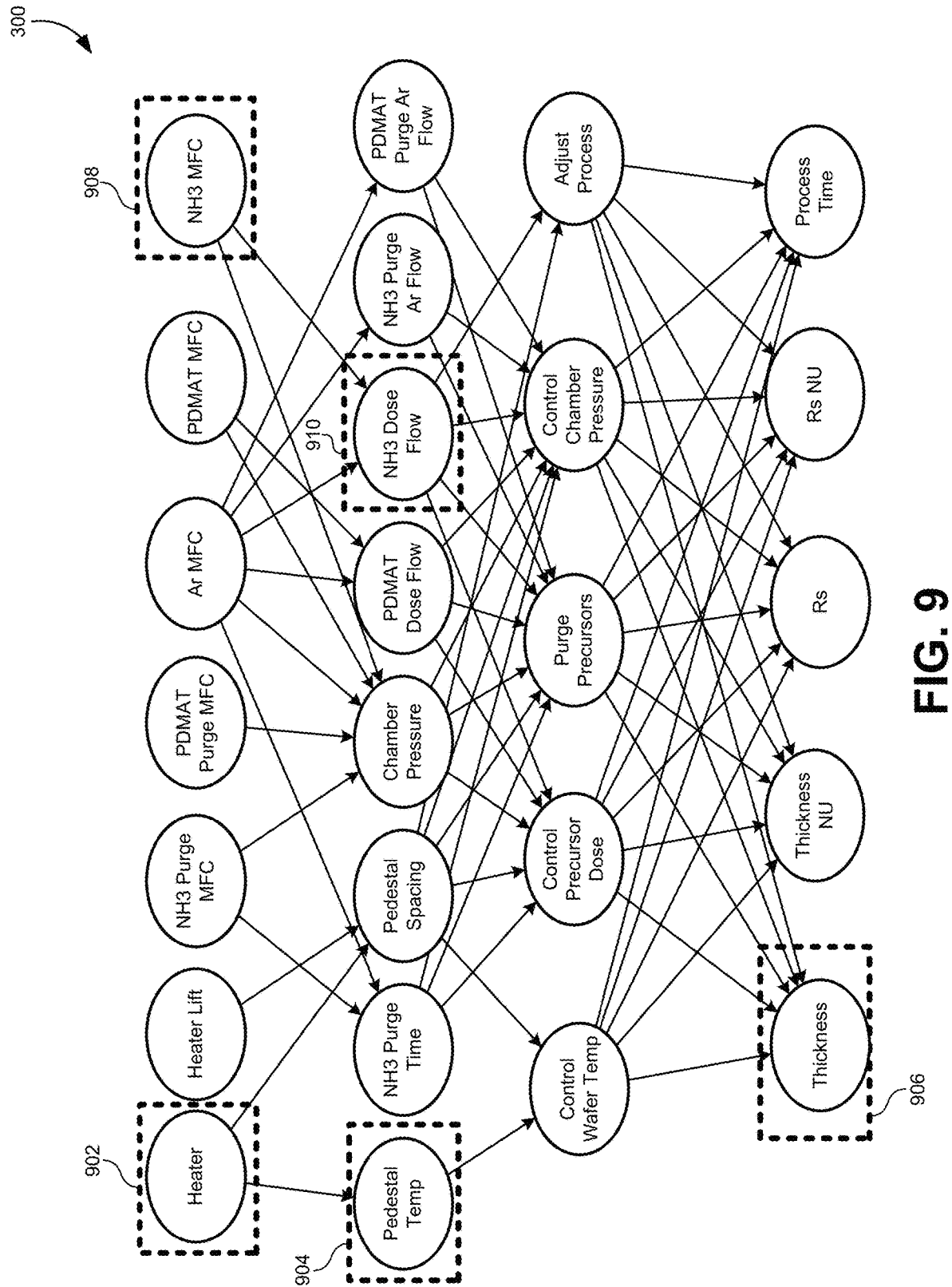
FIG. 9 illustrates how the causal relationships described in the network structure may be used to make changes to the operating parameters of the process, according to some embodiments.

In order to make adjustments based on these intrinsic variations, the source of the intrinsic variations may be identified using the network structure 300 described above. FIG. 9 illustrates how the causal relationships described in the network structure 300 may be used to make changes to the operating parameters of the process, according to some embodiments. For example, the data in FIG. 8 indicated that the pedestal temperature 904 and the $NH_3$ dose flow 910 are related to intrinsic variations. The causal relationships identified in the network structure 300 may identify specific hardware elements that can be controlled to adjust these intrinsic variations. For example, the heater 902 may be adjusted to compensate for the intrinsic variations found in the pedestal temperature 904. The mass flow controller for the $NH_3$ 908 may be adjusted to control the intrinsic variations found in the $NH_3$ dose flow 910. These adjustments may ultimately affect the thickness 906 of the semiconductor substrate.

For example, the when the optimal settings for the chamber are applied, the thickness 906 is sensitive to the $NH_3$ dose flows 910 and the pedestal temperature 904 since they affect a total reactant concentration in the chamber and should be investigated to identify the source of mismatch thicknesses. Using this causal relationship in the network structure 300, an operator may focus their investigation on the mass flow controller for the $NH_3$ 908 and the heater 902. They may focus not only on the direct interpretation of these parameters, but also the inherent variability in the design and installation of these devices in the chamber. For example, the heater 902 may be susceptible to asymmetric heater installation, thermocouple offsets, PID tuning, recipe set up steps, and so forth. The mass flow controller for the $NH_3$ 908 may have variations in delay times, correction factors, inlet pressure, and so forth across different installations.

Note that the example of mismatched performance on a substrate in a chamber described above is only provided by way of example and is not meant to be limiting. Many other applications for the Bayesian modeling process described above may be used in different situations. For example, the same techniques may be used to identify mismatched performances between semiconductor chambers tested in a laboratory and semiconductor chambers operating at customer facilities. The same techniques may be used to determine whether, for example, the thickness or other characteristics of a semiconductor substrate match between the two chambers or chamber types. The same analysis used above may be used to determine, for example, that the temperature is the primary variable responsible for variations in the thickness or other characteristics. Intrinsically, temperature may be identified as having a variability that strongly contributes to thickness mismatches between two chambers that exist even at different temperature setting levels (e.g., low, middle, high, optimal, etc.). Models may then be used to simulate and identify a recipe where the difference or mismatch between the two chambers is minimized. The customer may then choose to use the suggested recipe to minimize the variation in thickness. Hardware components that affect the temperature (e.g., the lamp head, the pyrometer, the reflector plate, etc.) may also be identified and adjustments may be made to those hardware components.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 10:
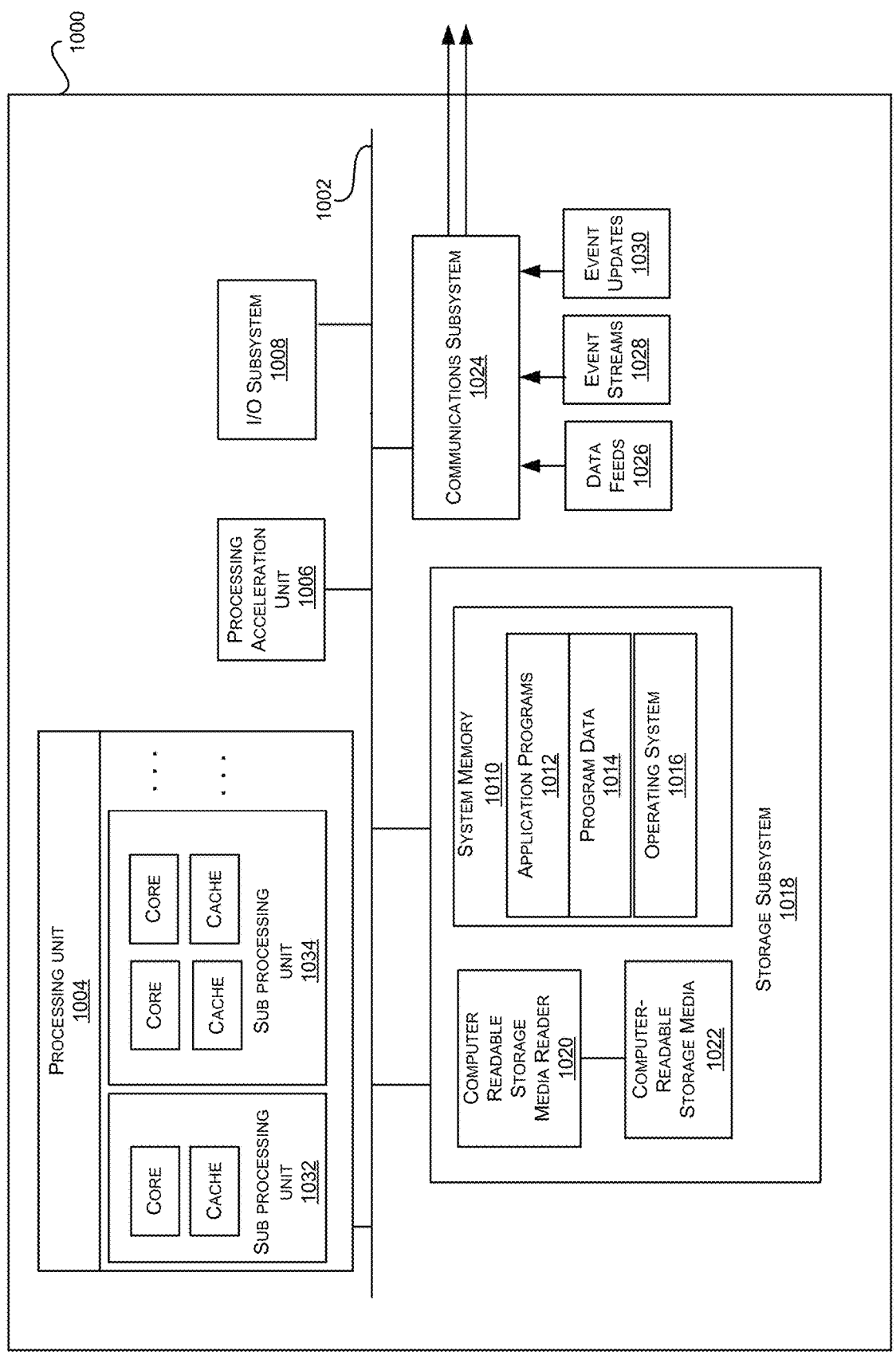
FIG. 10 illustrates an exemplary computer system, in which various embodiments may be implemented.

FIG. 10 illustrates an exemplary computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with some embodiments.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

As used herein, the terms "about" or "approximately" or "substantially" may be interpreted as being within a range that would be expected by one having ordinary skill in the art in light of the specification.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of identifying mismatched performances between semiconductor processing devices, the method comprising:
    accessing a network of causal relationships between processes and hardware in a semiconductor processing device, wherein the network of causal relationships comprises a node layer representing on-wafer effects, a node layer representing functional requirements, and a node layer representing hardware components;
    generating a first Bayesian model for a first semiconductor processing device using the causal relationships in the network and first performance data;
    generating a second Bayesian model for a second semiconductor processing device using the causal relationships in the network and second performance data;
    comparing response distributions generated by the first Bayesian model and the second Bayesian model to determine whether a performance of the of the first semiconductor processing device matches a performance of the second semiconductor processing device; and
    using the network of causal relationships to identify a hardware component and adjusting operational parameters of the hardware component to correct a mismatch in the performance between the first semiconductor processing device and the second semiconductor processing device.

2. The method of claim 1, further comprising:
    identifying variations in extrinsic variables in the first Bayesian model and the second Bayesian model indicating a sensitivity of the response distributions to hardware components in the first semiconductor processing device and the second semiconductor processing device.

3. The method of claim 1, further comprising:
    identifying variations in intrinsic variables in the first Bayesian model and the second Bayesian model indicating a sensitivity of the response distributions to connections between hardware components in the first semiconductor processing device and the second semiconductor processing device.

4. The method of claim 1, wherein the first Bayesian model is represented using a transfer function.

5. The method of claim 4, wherein the transfer function represents main effects, nonlinear effects, and interaction effects of the first semiconductor processing device that affect a response distribution of the first Bayesian model.

6. The method of claim 4, further comprising performing a first decomposition of the transfer function by subtracting the second Bayesian model from the first Bayesian model to generate variations of a distinct extrinsic variable across an operating range of the distinct extrinsic variable.

7. The method of claim 6, further comprising performing a second decomposition of the transfer function by aggregating each factor in the transfer function into variations of coefficients representing intrinsic variables for the distinct extrinsic variable.

8. A system comprising:
    one or more processors; and
    one or more memory devices comprising instructions that, when executed by the one or more processors, cause the one or more processors to perform operations comprising:
        accessing a network of causal relationships between processes and hardware in a semiconductor processing device, wherein the network of causal relationships comprises a node layer representing on-wafer effects, a node layer representing functional requirements, and a node layer representing hardware components;

generating a first Bayesian model for a first semiconductor processing device using the causal relationships in the network and first performance data;

generating a second Bayesian model for a second semiconductor processing device using the causal relationships in the network and second performance data;

comparing response distributions generated by the first Bayesian model and the second Bayesian model to determine whether a performance of the of the first semiconductor processing device matches a performance of the second semiconductor processing device; and using the network of causal relationships to identify a hardware component and adjusting operational parameters of the hardware component to correct a mismatch in the performance between the first semiconductor processing device and the second semiconductor processing device.

9. The system of claim 8, wherein the system is implemented on a controller of a semiconductor processing chamber.

10. The system of claim 8, wherein the system is implemented on a central platform that is in communication with controllers for a plurality of semiconductor processing chambers in a facility.

11. The system of claim 8, wherein the system is implemented on a remote server that is in communication with a plurality of different semiconductor processing facilities, each operating a plurality of semiconductor processing chambers.

12. The system of claim 8, wherein determining whether the performance of the of the first semiconductor processing device matches the performance of the second semiconductor processing device comprises:

calculating a J-S Divergence between the response distributions generated by the first Bayesian model and the second Bayesian model.

13. The system of claim 8, wherein determining whether the performance of the of the first semiconductor processing device matches the performance of the second semiconductor processing device comprises:

determining whether a similarity between the response distributions generated by the first Bayesian model and the second Bayesian model falls within a threshold of a Region of Practical Equivalence (ROPE).

14. The system of claim 8, wherein the operations further comprise performing a sensitivity analysis on extrinsic variables to identify at least one extrinsic variable that causes a mismatch in the performance between the first semiconductor processing device and the second semiconductor processing device.

15. One or more non-transitory computer-readable media comprising instructions that, when executed by one or more processors, cause the one or more processors to perform operations comprising:

accessing a network of causal relationships between processes and hardware in a semiconductor processing device, wherein the network of causal relationships comprises a node layer representing on-wafer effects, a node layer representing functional requirements, and a node layer representing hardware components;

generating a first Bayesian model for a first semiconductor processing device using the causal relationships in the network and first performance data;

generating a second Bayesian model for a second semiconductor processing device using the causal relationships in the network and second performance data;

comparing response distributions generated by the first Bayesian model and the second Bayesian model to determine whether a performance of the of the first semiconductor processing device matches a performance of the second semiconductor processing device; and using the network of causal relationships to identify a hardware component and adjusting operational parameters of the hardware component to correct a mismatch in the performance between the first semiconductor processing device and the second semiconductor processing device.

16. The one or more non-transitory computer-readable media of claim 15, wherein the one or more non-transitory computer-readable media are distributed between a controller of a semiconductor processing chamber and a remote server.

17. The one or more non-transitory computer-readable media of claim 15, wherein the operations further comprise identifying a cause of a mismatch in the performance between the first semiconductor processing device and the second semiconductor processing device.

18. The one or more non-transitory computer-readable media of claim 15, wherein the operations further comprise:

accessing a system functional map comprising a data structure that relates requirements for the first semiconductor processing device to functional requirements for components in the first semiconductor processing device, then to technology components, then to on-wafer effects; and automatically generating the network of causal relationships from the functional map.

* * * * *